US 6,707,962 B1

(12) United States Patent
Cai

(10) Patent No.: US 6,707,962 B1
(45) Date of Patent: Mar. 16, 2004

(54) METHOD FOR PROVIDING SIGNAL POWER TILT COMPENSATION IN OPTICAL TRANSMISSION SYSTEMS

(75) Inventor: Yuanmin Cai, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 579 days.

(21) Appl. No.: 09/620,034

(22) Filed: Jul. 20, 2000

(51) Int. Cl.$^7$ ............................. G02B 6/28; H04J 14/02
(52) U.S. Cl. ............................. 385/24; 385/37; 398/87; 398/141; 359/337.1
(58) Field of Search ............................. 359/124–134, 359/333, 337.1, 337.21; 398/84, 87, 92, 141, 157; 385/24, 37

(56) References Cited

U.S. PATENT DOCUMENTS

| | | | | |
|---|---|---|---|---|
| 5,414,548 A | * | 5/1995 | Tachikawa et al. | 398/87 |
| 5,452,116 A | * | 9/1995 | Kirkby et al. | 359/124 |
| 5,546,483 A | * | 8/1996 | Inoue et al. | 385/14 |
| 5,940,555 A | * | 8/1999 | Inaba et al. | 385/24 |
| 6,034,812 A | * | 3/2000 | Naito | 359/337.11 |
| 6,222,956 B1 | * | 4/2001 | Akiba et al. | 385/24 |
| 6,496,619 B2 | * | 12/2002 | Naganuma | 385/27 |

OTHER PUBLICATIONS

A. Rigny et al. Double–Phased Array For A Flattened Spectral Response. Sep. 22–25, 1997. Conference Publication No. 448, IEE, 1997. (pp. 79–82).*
K. Maru et al. Athermal and Center Wavelength Adjustable Arrayed–Waveguide Grating. Optical Fiber Communication Conference, 2000. vol.: 2, 2000. Page(s): 130–132 vol. 2□□.*

NTT Electronics, "Arrayed–Wavelength Grating Multi/De-multiplexer," printed from www.nel.co.jp/photo/plc/awg/index.html, Jun. 26, 2000.

NTT Electronics, "AWG Multi/Demultiplexer (Heater Type)," printed from www.nel.co.jp/photo/plc/awg/heater.html, Jun. 26, 2000.

NTT Electronics, "AWG Multi/Demultiplexer (Peltier Type)," printed from www.nel.co.jp/photo/plc/awg/peltier.html, Jun. 26, 2000.

NTT Electronics, "AWG Multi/Demultiplexer (All–in–one type)," printed from www.nel.co.jp/photo/plc/awg/box.html, Jun. 26, 2000.

* cited by examiner

Primary Examiner—Kinfe-Michael Negash
(74) Attorney, Agent, or Firm—Baker Botts L.L.P.

(57) ABSTRACT

In one embodiment, the present invention provides a method of transmitting an optical signal. This signal is transmitted through an optical fiber 12 (24) and is amplified by an optical amplifier 14 (22). The signal is then provided to an arrayed waveguide grating 16 (20). The arrayed waveguide grating 16 (20) has a wavelength-dependent optical amplitude response characterized in that the wavelength having the peak optical amplitude is different than the center channel wavelength of the signal. In some instances, this may result in a situation where the total tilt effect for the optical fiber 12 (24), the optical amplifier 14 (22) and the arrayed waveguide grating 16 (20) is less than the total tilt effect for the optical fiber 12 (24), the optical amplifier 14 (22) and an arrayed waveguide grating with a standard wavelength-dependent optical amplitude response where a signal at the center channel wavelength corresponds to the peak optical amplitude of the arrayed waveguide grating.

29 Claims, 1 Drawing Sheet

METHOD FOR PROVIDING SIGNAL POWER TILT COMPENSATION IN OPTICAL TRANSMISSION SYSTEMS

FIELD OF THE INVENTION

This invention relates generally to optical fiber communications and specifically to a method for providing signal power tilt compensation in optical transmission systems.

BACKGROUND OF THE INVENTION

Fiber communication systems are prevalent in many networks. For example, optical fibers can be used for voice networks, data networks as well as hybrid networks. (e.g., networks that carry voice, data, video and possibly other types of information). These systems are especially useful to transport information over long distances.

Fiber communication systems have a number of advantages over other choices. Due to the very high frequencies at which these systems operate, a very high bandwidth can be achieved. Attenuation is also significantly lower for optical fiber than for copper cable and optical fiber systems are not affected by external electromagnetic fields. In addition, a typical optical system will include fewer repeaters.

There is, however, a limit as to the distance a light signal may travel. To increase this distance, optical amplifiers may be used. Optical amplifiers are advantageous in that they boost the optical amplitude of a signal.

One technique used to increase the capacity of an optical system is Wavelength Division Multiplexing (WDM). In this type of system, a number of signals are transmitted concurrently, each signal having an identifiable wavelength. When a large number of wavelengths are used, the system might be referred to as a Dense Wavelength Division Multiplexing (DWDM) system.

An arrayed waveguide grating (AWG) wavelength multi/demultiplexer is a device which combines and/or splits optical signals of different wavelengths for use in WDM systems. The heart of the device, the AWG, consists of a number of arrayed channel waveguides which together act like a diffraction grating in a spectrometer. The grating has a high wavelength resolution, thus attaining narrow wavelength channel spacing such as 0.8 nm in ITU channel allocation. Moreover, the multi/demultiplexer is extremely stable against mechanical vibration and has long-term reliability because it is composed of silica-based planar lightwave circuits.

SUMMARY OF THE INVENTION

In WDM optical transmission, signal powers at different wavelengths experience different amount of losses from fibers, different gains from amplifiers, and other loss variations from components such as multiplexing/demultiplexing couplers. In one aspect, this invention proposes to use the inherent loss variation of arrayed waveguide grating (AWG) multiplexing/demultiplexing coupler to cancel the effects of the fiber loss and amplifier gain variations. In the preferred embodiment, this proposal can be implemented by designing the AWG peak channel wavelength at an offset of the center channel wavelength of the transmission band.

In a first embodiment, the present invention provides a method of transmitting an optical signal. This signal is transmitted through an optical fiber and is amplified by an optical amplifier. The signal is then provided to an arrayed waveguide grating. The arrayed waveguide grating has a wavelength-dependent optical amplitude response characterized in that the wavelength having the peak optical amplitude is different than the center channel wavelength. In some instances, this may result in a situation where the total tilt effect from the optical fiber, the optical amplifier and the arrayed waveguide grating is less than the total tilt effect from the optical fiber, the optical amplifier and an arrayed waveguide grating with a standard wavelength-dependent optical amplitude response where a signal at the center channel wavelength corresponds to the peak optical amplitude of the arrayed waveguide grating.

In another aspect, the present invention provides an arrayed waveguide grating having a wavelength dependent optical amplitude response. The amplitude response ranges from a first wavelength to a second wavelength and has a center wavelength that is about half way between the first wavelength and the second wavelength. The amplitude response further has a peak wavelength where the optical amplitude is at its highest level between the first wavelength and the second wavelength. In the preferred embodiment, the peak wavelength is different than the center wavelength.

Various aspects of the present invention provide advantages. For example, in one aspect, the present invention provides a cost-effective way for balancing out signal performance across different wavelengths suffered from fiber loss and amplifier gain variation. It reduces the requirement for pre-emphasis of signal power at the source, which is sometimes insufficient to guarantee system performance and is a complicated process. It uses the common known problem of wavelength dependent loss of AWG to its advantage to proactively compensate other system component performances. This will in turn reduce the overall system cost.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed here are merely illustrative of specific ways to make and use the invention, and do not limit the scope of the invention.

The present invention will now be described with reference to specific embodiments. These examples can be used to understand the concepts provided herein.

Figure 1:
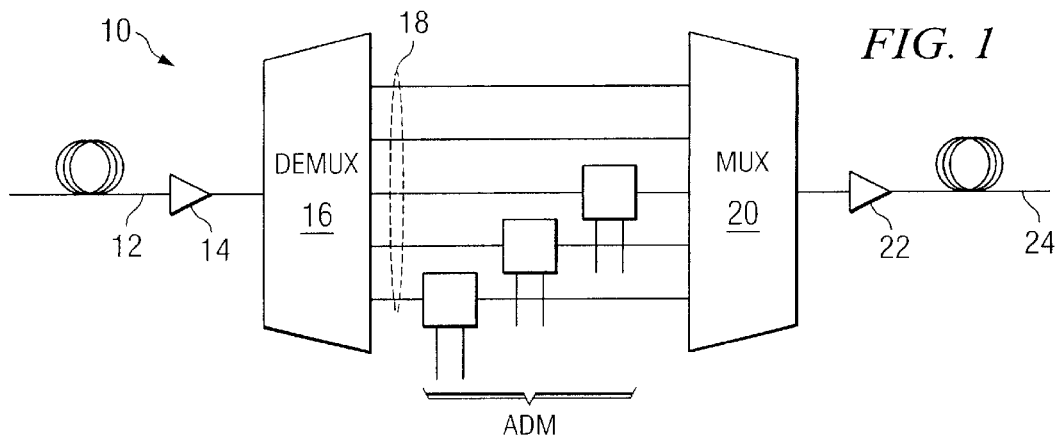
FIG. 1 is a block diagram of a system of the present invention.

FIG. 1 illustrates a conceptual diagram of a portion 10 of a communication system. In particular, this figure shows an optical add-drop module (OADM). An optical fiber 12 is included to carry an optical signal. In the preferred embodiment, this optical signal is a dense wavelength division multiplexed (DWDM) signal. A DWDM signal includes a large number of distinguishable wavelengths, each of which can be individually decoded. In the preferred embodiment, the DWDM signal includes about 32 wavelengths or channels, ranging from 1536.6 nm to 1561.4 nm, at 100 GHz spacing. Other systems could also utilize the present invention.

The system 10 also includes an optical amplifier 14. The amplifier 14 amplifies the optical signal to compensate attenuation that may have occurred during transmission through the fiber 12. In the preferred embodiment optical amplifier 14 is implemented with Erbium-doped fiber amplifier having C band amplification which covers the DWDM signal band.

A demultiplexer 16 receives the DWDM signal from the amplifier 14. The demultiplexer separates out the individual channels so that each channel can be manipulated by the add-drop module (ADM) 18. In the preferred embodiment, demultiplexer 16 is implemented with an arrayed waveguide grating (AWG). The AWG is formed from a number of arrayed channel waveguides with coupling lenses which together act like a diffraction grating in a spectrometer.

Each optical signal of different wavelength is sent to ADM 18 where it could be passed on to fiber 24 either without manipulation or after being regenerated through an optical-to-electrical conversion and then an electrical-to-optical conversion. The signal could also be dropped out of the path to somewhere other than to fiber 24 while new signals could be added onto the path to be passed on to fiber 24.

Multiplexer 20 is provided to recombine the optical signals at different wavelengths to a new DWDM signal. The DWDM signal could then optionally be amplified by an amplifier 22 and transmitted through optical fiber 24. Since the optical transmission is considered unidirectional in this embodiment, an analogous system can be provided for transmission in the other direction.

Figure 2:
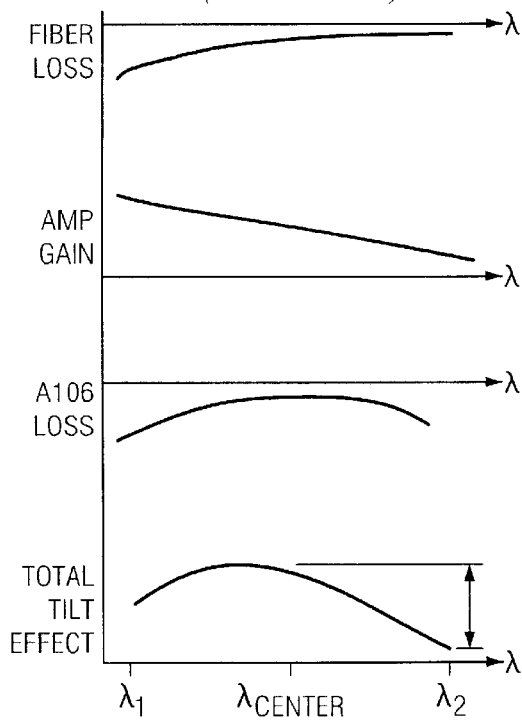
FIG. 2 is a series of plots showing the wavelength-dependent optical amplitude response for portions of a conventional system.

FIG. 2 shows the optical amplitude response for each of the elements in the ingress (or egress) portions of system 10. In the ideal case, gain or loss of each element would be the same for signals at any wavelength within the optical transmission band (i.e., from the lowest wavelength $\lambda_1$ to the highest wavelength $\lambda_2$). Unfortunately, the optical amplitude response is wavelength-dependent. That is, signals at different wavelengths will experience different losses or gains.

Referring to now FIG. 2, it can be seen that a typical optical fiber 12 (24) may experience greater loss at lower wavelengths than at higher wavelengths, which will in general depend on transmission band. The optical amplifier 14 (22), on the other hand, has a greater gain at the lower wavelengths than at the higher wavelengths without the gain-equalization unit inside which usually adds to the cost and complexity of the amplifier. The AWG 16 (20) is typically designed to minimize the variation in loss from peak wavelength (i.e., the channel that experiences the least loss) to the wavelength with greatest loss. Since the AWG response is generally parabolic, this design goal is achieved by having the peak wavelength close to, or equal to, the center wavelength.

Combination of the amplitude responses for each of the three elements is shown in the last plot in FIG. 2. In this case, the overall response has a wavelength that is less than the center of the transmission band and experiences more gain (or less loss) than at the higher wavelengths. The total tilt effect of the overall response can be determined by looking at the difference in gain (or loss) between the wavelength with the most gain (or least loss) and the wavelength with the least gain (or most loss). In a typical conventional case, the total tilt effect could be between about 4 and about 8 dB per one OADM node.

To minimize the total tilt effect, the designers of each of the components (e.g., fiber 12, optical amplifier 14, and AWG 16) attempt to minimize the tilt effect contributed by their individual component. Clearly, if the amplitude for each component was flat over the transmission band, then the total amplitude response would also be flat.

At the system level, the imperfections in the total amplitude response are corrected through pre-emphasis. Pre-emphasis is a technique where signals at wavelengths that experience more loss (or less gain) are introduced at higher amplitude levels than signals that experience less loss (or more gain). By starting at a greater amplitude, these signals will end up about equal to those that experience less loss in terms of optical signal to noise ratio, and thus signal performance.

In one aspect, the present invention provides a technique that can be used to minimize or even eliminate the need for pre-emphasis. For example, the invention can include either positive or negative wavelength offset to the AWG peak wavelength to combat the amplifier gain tilt, as well as the fiber loss tilt either in C band, L band, or any other transmission band. The gain equalization which is normally required inside the amplifier 14 (22), may be saved because the amplifier gain tilt is now compensated by the AWG unit 16 (20). In the preferred embodiment, this compensation is achieved by shifting peak wavelength of the AWG 16 (20) away from the center wavelength to compensate for the tilt of the fiber 12 (24) and/or the amplifier 14 (22).

Figure 3:
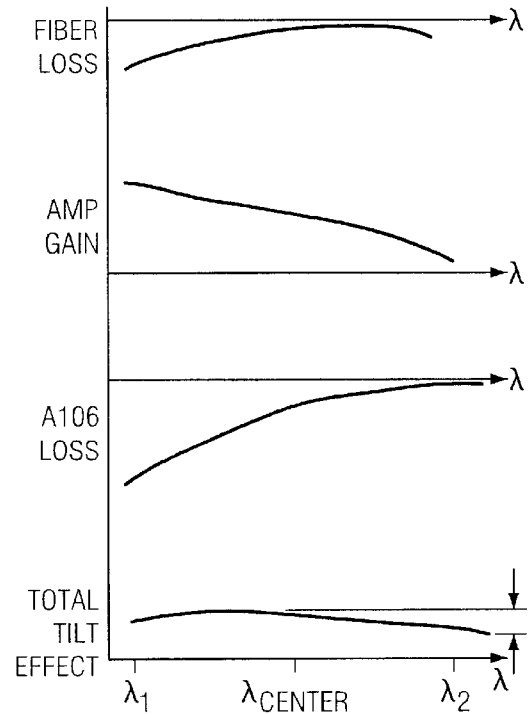
FIG. 3 is a series of plots showing the wavelength-dependent optical amplitude response for portions of a system of the present invention.

FIG. 3 illustrates the wavelength-dependent optical amplitude responses for each of the components as well as the combined system. In this embodiment, the response of the fiber 12 (24) and the amplifier 14 (22) are assumed to be the same as in the conventional case. The AWG response, however, has been shifted so that its peak wavelength is different than the center wavelength.

In this context, the center wavelength ($\lambda_{center}$) is the channel of the multi-wavelength signal that is in the middle of the AWG amplitude response. This center wavelength can be determined in more than one way, any of which are acceptable. First, the center wavelength could be the middle channel of an equally spaced WDM signal. For example, if the WDM signal carries thirty-two channels, the wavelength that carries either the sixteenth or the seventeenth signal would be the center wavelength. In another approach, the center wavelength could be an ITU grid channel which is closest to the middle wavelength point between the lowest wavelength ($\lambda_1$) and the highest wavelength ($\lambda_2$) of the signal band.

In this context, the peak wavelength ($\lambda_{peak}$) is provided as the wavelength that carries the signal with the least loss of the AWG unit. In the preferred embodiment, the peak wavelength is different than the center wavelength. The amount of the difference will depend upon the specific system design. For example, in some systems the peak wavelength may be very close to either the highest wavelength ($\lambda_2$) or the lowest wavelength ($\lambda_1$).

In the embodiment illustrated by FIG. 3 for a thirty-two channel transmission with wavelength ranging from 1536.6 nm to 1561.4 nm, the peak wavelength is the same as the highest wavelength ($\lambda_2$, 1561.4 nm). For this particular system, this choice was made to compensate for the fairly high drop off of amplifier gain at the higher wavelengths. Depending upon the response of the other components, other choices could be made.

It should be noted that the tilt effect of the AWG of the preferred embodiment is in general greater than the tilt effect of the AWG of the prior art. At first glance, this fact is somewhat counter-intuitive given that one of the goals of AWG designers is to minimize the tilt effect. In this aspect of the invention, however, additional loss is intentionally introduced to compensate for the effect of other components.

In some embodiments, the present invention has the feature that the total tilt effect (e.g., the tilt effect of the combination of the optical fiber, the optical amplifier, and the AWG) is less than the tilt effect of each of those components taken alone. This feature comes about from the compensation effect that some components have on the others. In the preferred embodiment, the total tilt effect could be made less than about 0.5 dB.

In one embodiment, the present invention can be implemented by designing a conventional AWG and then using only half of the channels. This element would have an amplitude response in line with the one shown in FIG. 3. In some cases, the AWG may not need to have twice the channel coverage as the actual number of working channels, depending on the overall system design requirement.

As an alternate or additional feature, the amplifier 14 (or 22) and demultiplexer 16 (or multiplexer 20) can also be provided as a pair to make a tilt-less combined unit. One way to implement this embodiment is to design the AWG to cancel the wavelength dependent effects of the amplifier. In this embodiment, the two components can be disposed in a single housing. This combination would create a simple single product. The user would not need to understand the details inside the housing.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of transmitting an optical signal, the method comprising:
    transmitting a multi-wavelength optical signal through an optical fiber, the optical fiber having a first wavelength-dependent optical amplitude response, the multi-wavelength optical signal having a center wavelength;
    amplifying the multi-wavelength optical signal within an optical amplifier, the optical amplifier having a second wavelength-dependent optical amplitude response;
    providing the multi-wavelength optical signal to an arrayed waveguide grating, the arrayed waveguide grating having a third wavelength-dependent optical amplitude response, the arrayed waveguide grating having a peak wavelength that is offset from the center wavelength of the optical signal, the third response characterized by the peak wavelength having a peak optical amplitude different than the center wavelength of the multi-wavelength optical signal.

2. The method of claim 1 wherein the total tilt effect for the optical fiber, the optical amplifier and the arrayed waveguide grating is less than the total tilt effect for the optical fiber, the optical amplifier and an arrayed waveguide grating with a standard wavelength-dependent optical amplitude response where a signal at the center channel wavelength corresponds to the peak optical amplitude of the arrayed waveguide grating.

3. The method of claim 1 wherein the total tilt effect for the optical fiber, the optical amplifier and the arrayed waveguide grating is less than about 0.5 dB.

4. The method of claim 1 wherein the multi-wavelength optical signal includes about thirty-two signals, each carrying a different wavelength.

5. The method of claim 1 wherein the center wavelength is an ITU grid channel wavelength which is closest to the middle wavelength point between the lowest wavelength and the highest wavelength of the multi-wavelength signal band.

6. The method of claim 5 wherein the peak wavelength of the AWG unit is closer to one of the lowest wavelength or the highest wavelength than the center wavelength.

7. The method of claim 6 wherein the peak wavelength is the same as the lowest wavelength or the highest wavelength of the multi-wavelength signal band.

8. An arrayed-waveguide grating having a wavelength dependent optical amplitude response, the amplitude response ranging from a first wavelength to a second wavelength and having a center wavelength that is about half way between the first wavelength and the second wavelength, the amplitude further having a peak wavelength that is offset from the center wavelength so that the optical amplitude is at its highest level between the first wavelength, and the second wavelength, and the peak wavelength is different than the center wavelength.

9. The arrayed-waveguide grating of claim 8 wherein the center wavelength is an ITU grid channel wavelength which is closest to the middle wavelength point of the first wavelength and the second wavelength of the multi-wavelength signal band.

10. The arrayed-waveguide grating of claim 9 the peak wavelength of the AWG unit is closer to one of the first wavelength or the second wavelength than the center wavelength.

11. The arrayed-waveguide grating of claim 10 wherein the peak wavelength is the same as the first wavelength or the second wavelength of the multi-wavelength signal band.

12. An optical communication system comprising:
    an optical fiber having a first wavelength-dependent optical amplitude response;
    an optical amplifier coupled to the optical fiber, the optical amplifier having a second wavelength-dependent optical amplitude response; and
    an arrayed waveguide grating coupled to the optical amplifier, the arrayed waveguide grating having a third wavelength-dependent optical amplitude response, the arrayed waveguide grating having a peak wavelength that is offset from a center wavelength of an optical signal so that the third response includes a center wavelength that is different than the peak wavelength.

13. The system of claim 12 wherein the optical amplifier includes an input coupled to the optical fiber and an output coupled to the arrayed waveguide grating.

14. The system of claim 12 wherein the optical amplifier includes an output coupled to the optical fiber and an input coupled to the arrayed waveguide grating.

15. The system of claim 12 and further comprising:
    a second arrayed waveguide grating coupled to the arrayed waveguide grating;
    a second optical amplifier coupled to the second arrayed waveguide grating; and
    a second optical fiber coupled to the second optical amplifier.

16. The system of claim 12 wherein the total tilt effect for the optical fiber, the optical amplifier and the arrayed waveguide grating is less than the total tilt effect for the optical fiber, the optical amplifier and an arrayed waveguide grating with a standard wavelength-dependent optical amplitude response where a signal at the center wavelength corresponds to the peak optical amplitude of the arrayed waveguide grating.

17. The system of claim 12 wherein the total tilt effect for the optical fiber, the optical amplifier and the arrayed waveguide is less than about 0.5 dB.

18. The method of claim 12 wherein the communication system carries a multi-wavelength optical signal and wherein the center wavelength is an ITU grid channel wavelenght which is closest to the middle wavelength point of the lowest wavelength and the highest length of the multi-wavelength signal band.

19. The method of claim 18 wherein the peak wavelength of the AWG unit is closer to one of the lowest wavelength or the highest wavelength than the center wavelength.

20. The method of claim 19 wherein the peak wavelength is the same as one of the lowest wavelength or the highest wavelength of the multi-signal wavelength signal band.

21. An optical device comprising:
   a housing;
   an optical amplifier disposed within the housing; and
   an arrayed-waveguide grating disposed within the housing and coupled to the optical amplifier, the arrayed-waveguide grating having a wavelength dependent optical amplitude response, the amplitude response ranging from a first wavelength to a second wavelength and having a center frequency that is about half way between the first wavelength and the second wavelength, the amplitude further having a peak wavelength that is offset from a center wavelength of an optical signal so that the optical amplitude is at its highest level between the first wavelength and the second wavelength, the peak wavelength being different than the center wavelength.

22. The device of claim 21 wherein the center wavelength is an ITU grid channel wavelength which is closest to the middle wavelength point of the first wavelength and the second wavelength of the multi-wavelength signal band.

23. The arrayed-waveguide grating of claim 22 wherein the peak wavelength of the AWG unit is closer to one of the first wavelength or the second wavelength than the center wavelength.

24. The arrayed-waveguide grating of claim 23 wherein the peak wavelength is the same as the first wavelength or the second wavelength of the multi-wavelength signal band.

25. An optical communication system comprising:
   an optical fiber having a first wavelength-dependent optical amplitude response having a first tilt effect;
   an optical amplifier coupled to the optical fiber, the optical amplifier having a second wavelength-dependent optical amplitude response having a second tilt effect; and
   an arrayed waveguide grating coupled to the optical amplifier, the arrayed waveguide grating having a third wavelength-dependent optical amplitude response having a third tilt effect;
   wherein the total tilt effect of the combination of the optical fiber, the optical amplifier, and the arrayed waveguide grating is less than the first tilt effect, is less than the second tilt effect and is less than the third tilt effect, the arrayed waveguide grating having a peak wavelength that is offset from a center wavelength of a multi-wavelength optical signal.

26. The system of claim 25 wherein the third response has a peak wavelength and a center wavelength that is different than the peak wavelength.

27. The system of claim 25 wherein the total tilt effect for the optical fiber, the optical amplifier and the arrayed waveguide grating is less than the total tilt effect for the optical fiber, the optical amplifier and an arrayed waveguide grating with a standard wavelength-dependent optical amplitude response where a signal at the center wavelength corresponds to the peak optical amplitude of the arrayed waveguide grating.

28. The system of claim 25 wherein the ratio of the total tilt effect for the optical fiber, the optical amplifier and the arrayed waveguide grating as compared to the total tilt effect for the optical fiber, the optical amplifier and an arrayed waveguide grating with a standard wavelength-dependent optical amplitude response is less about 0.1.

29. The system of claim 25 wherein the total tilt effect is less than about 0.5 dB.

* * * * *

UNITED STATES PATENT AND TRADEMARK OFFICE
CERTIFICATE OF CORRECTION

PATENT NO.     : 6,707,962 B1
DATED          : March 16, 2004
INVENTOR(S)    : Yuanmin Cai It is certified that error appears in the above-identified patent and that said Letters Patent is hereby corrected as shown below:

<u>Column 4,</u>
Line 24, after "equalization", insert -- unit, --.

<u>Column 7,</u>
Line 12, delete "wavelenght" and insert -- wavelength --.
Line 13, after "highest", delete "length" and insert -- wavelength --.

<u>Column 8,</u>
Line 40, after "less", insert -- than --.
Line 40, after "0.1", insert -- dB --.

Signed and Sealed this

Sixth Day of July, 2004

JON W. DUDAS
*Acting Director of the United States Patent and Trademark Office*